June 9, 1964

L. E. STONE ETAL 3,136,391

SELF-ADJUSTING BRAKE

Filed July 20, 1962

INVENTORS
LLEWELLYN E. STONE
BY NORMAN HILT
WILSON, SETTLE & CRAIG
ATTORNEYS

June 9, 1964  L. E. STONE ETAL  3,136,391
SELF-ADJUSTING BRAKE

Filed July 20, 1962  2 Sheets-Sheet 2

INVENTORS
LLEWELLYN E. STONE
BY NORMAN HILT
WILSON, SETTLE & CRAIG
ATTORNEYS

United States Patent Office 3,136,391
Patented June 9, 1964

3,136,391
SELF-ADJUSTING BRAKE
Llewellyn E. Stone, 28100 Gladstone, St. Clair Shores, Mich., and Norman Hilt, St. Clair Shores, Mich.; said Hilt assignor to said Stone
Filed July 20, 1962, Ser. No. 211,237
7 Claims. (Cl. 188—79.5)

The present invention relates to a self-adjusting brake, and more particularly to a mechanism for accurately adjusting the brake shoes during normal functioning of the brake.

It has long been considered desirable in the automotive industry to provide a self-adjusting brake. As is well-known, as the lining of a brake wears down, it is necessary to move the brake shoes closer to the brake drum in order to compensate for the wear. Manual adjustment of brakes is not only relatively expensive, but is done only at periodic intervals. In between the times when the brake is adjusted, it is obvious that there is inherently a maladjustment of the brake. The brake is adjusted only when the maladjustment reaches what is considered to be the danger point. The present invention provides a brake construction in which the brake is continually adjusted so that it will always be in accurate adjustment, and wherein the adjusting is automatic, thus obviating the inconvenience of taking the car or other vehicle into a repair garage and bearing the expense of a mechanic's time for adjusting the brake.

It is, therefore, an object of the invention to provide a self-adjusting vehicle brake.

Another object of the invention is to provide an adjusting mechanism which, after each adjusting action, will relax slightly to move the brake lining away from contact with the drum surface, thus preventing drag of the lining on the drum during periods when the brake is not applied.

A further object of the invention is to provide a pair of adjusting mechanisms for each brake.

Another object of the invention is to provide an adjusting mechanism which is operative only at periods when a force is not applied thereto, the adjusting mechanism being so constructed that it is not capable of applying sufficient force by itself to cause undesired actuation of the brake shoe.

A still further object of the invention is to provide an adjusting mechanism which is safe in operation in that the failure of one of the two mechanisms provided will not cause total brake failure, one of the adjusting mechanisms being capable of maintaining the brake in operative condition.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of contruction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
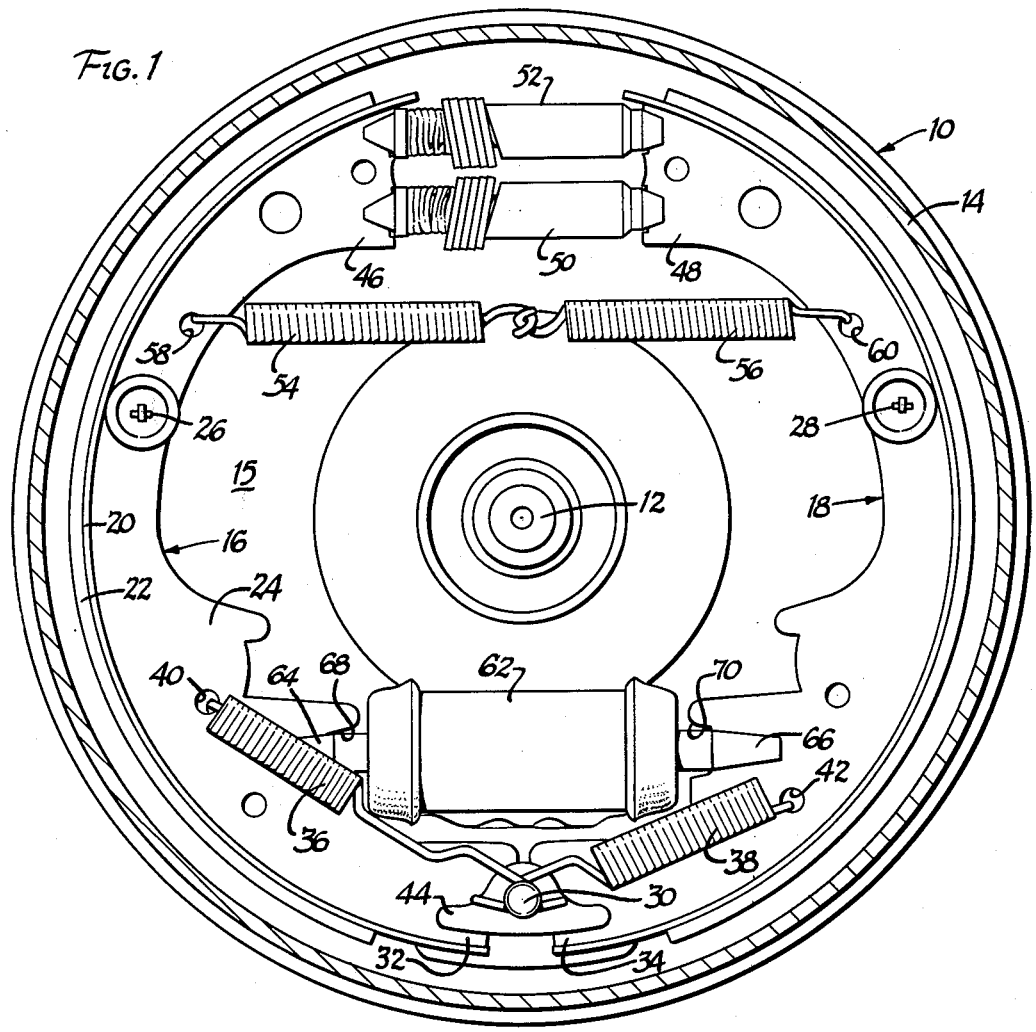
FIGURE 1 is a top plan view of one embodiment of a brake assembly according to the present invention, the face of the brake drum being broken away to illustrate the braking mechanism.

Referring to FIGURE 1, it will be seen that the brake therein illustrated is in most respects conventional. A brake drum 10 is rotatably mounted on an axle 12 of a vehicle. The brake drum has a circular flange 14 which encircles the brake shoes 16, 18 and associated structure, including a backing plate 15 which is fixedly mounted on the axle 12.

The shoes are of the usual semi-circular form having a curved support plate 20 concentric with the drum flange 14. The brake lining 22 is secured to the outer surface of the plate 20 by means of an adhesive material. A plate 24 is secured to the inner surface of the support plate 20 and extends substantially along the longitudinal axis thereof at right angles to the surface thereof. The shoes 16, 18 are secured to the backing plate 15 by means of spring-loaded pins 26, 28. The pin structures permit limited pivoting of the shoes but prevent movement of the shoes away from the backing plate 15.

A pin 30 extends from the backing plate 15 between the ends 32, 34 of the shoes. A pair of coil springs 36, 38 are attached at one end to the pin 30 and at the other end to openings 40, 42 in the plate 24 to urge the ends 32, 34 of the shoes into abutment with the pin 30. A plate 44 is provided on the pin 30 to position the ends of the springs 36, 38.

The other ends 46, 48 of the brake shoes are pivotally mounted on brake-adjusting mechanisms, 50, 52 as will be noted, the adjusting mechanism 50 is positioned radially inwardly of the brake drum 10 with respect to the adjusting mechanism 52. A pair of coil springs 54, 56 is provided to urge the ends 46, 48 into pivotal engagement with the adjusting mechanisms. The springs 54, 56 are attached together at one end, the other ends thereof being secured, respectively, in openings 58, 60 of the plate 24.

An hydraulically-actuated brake cylinder 62 is provided adjacent the ends 32, 34 of the brake shoes. The cylinder 62 has axially extending plungers 64, 66 which have slotted ends which are received on the plate 24. Notches 68, 70 are provided in the plate 24 to position the plungers with respect to the plate.

Figure 2:
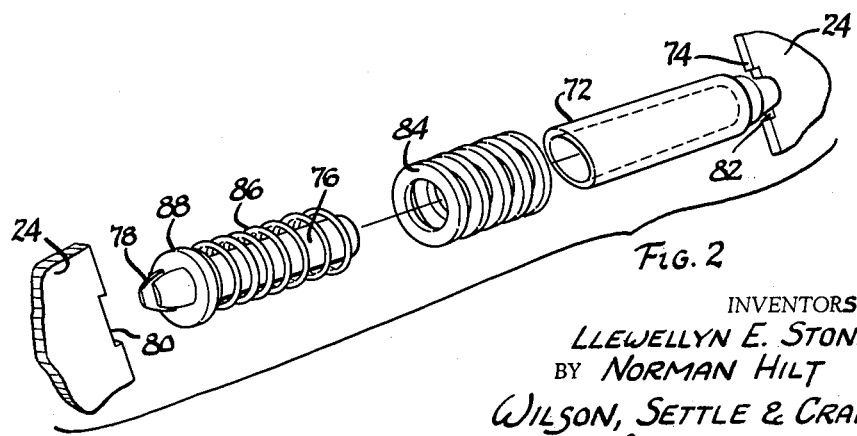
FIGURE 2 is an enlarged view in perspective of one of the adjusting mechanisms of FIGURE 1.

The construction of the brake-adjusting mechanisms 50, 52 is best seen in FIGURE 2. Each of the mechanisms comprises a sleeve 72 having a slot 74 in one end which is received on the plate 24 of the shoe 16. The other end of the sleeve 72 is cut at an angle other than 90° to the longitudinal axis of the sleeve. A pin 76 is telescopingly received in the sleeve 72. The pin 76 has a slot 78 at its outer end which is received on the plate 24 of the shoe 18. The plates 24 of the shoes 16, 18 are provided with notches 80, 82 to position the adjusting device with respect thereto. A plurality of washers 84 are received on the pin 76. The washers are positioned adjacent to the slanted end of the sleeve 72. A coil spring 86 is received on the pin 76 between the washers 84 and the enlarged head 88 of the pin.

Figure 3:
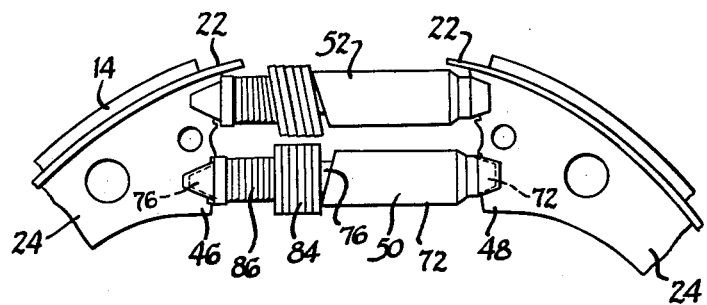
FIGURE 3 is a view illustrating the action of the adjusting mechanisms when the brake is applied.
Figure 4:
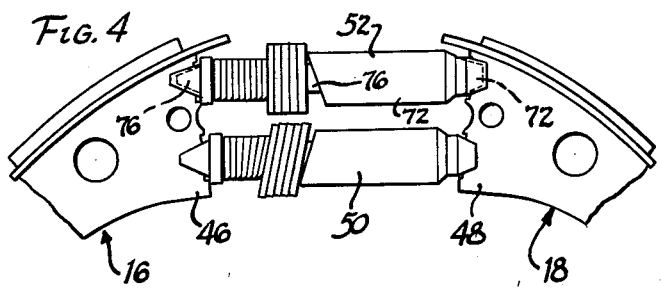
FIGURE 4 is a view similar to FIGURE 3 illustrating the adjusting action when the brake has been released.

Operation of the adjusting devices will be best understood by reference to FIGURES 3 and 4. As shown in FIGURE 3, when the cylinder 62 is actuated by the master brake cylinder (not shown) the plungers 64, 66 force the shoes 16, 18 to pivot about the adjusting element 52 and into braking engagement with the flange 14 of the drum 10. At this time, no pressure is applied to the adjusting element 50, which is positioned radially inwardly of the element 52, because the ends 46, 48 move away from the element 50 during the braking action. The sleeve 72 and pin 76 of the mechanism 50 will, under the urging of the spring 86, tend to separate from the position shown in dotted lines and move to re-establish contact with the plate 24 of the shoes 16, 18 as shown in full lines. The separation is normally slight, and in the event that there is no need for adjustment of the shoes, the sleeve 72 and pin 76 will return to their initial position upon release of the brake. However, should the linings 22 be worn, the pin 76 and sleeve 72 will not return to their initial position upon release of the brake. This results from the cooperative interaction of the washers 84 and slanted end of the sleeve 72. As will be appreciated, the slanted end of the sleeve 72 cocks the washers 84 with respect to the longitudinal axis of the pin 76. This cocking action causes the washers to grip the pin 76 and prevent movement of the pin into the sleeve 72. There is a slight movement of the washers 84 along the pin 76 while the cocking action takes effect and before the washers bite into the pin 76. This may be referred to as a relaxation of the device and permits the device to normally return to its initial position to provide the normal clearance between the brake shoe lining and the inner surface of the drum flange 14 to prevent the brake from dragging during periods of non-use. However, if the separation of the sleeve 72 and pin 76 is more than normal, due to the wearing of the brake lining, the relaxation of the device will not be sufficient to return the pin and sleeve to their initial positions. The difference of the initial position and final position is sufficient to compensate for lining wear.

When the brake is released, the shoes 16, 18 will return to their initial position under the urging of the springs 36, 38, 54, 56 as illustrated in FIGURE 4. At this point the shoes will pivot about the adjusting device 50 which has been enlarged as above described. No pressure is applied to the brake-adjusting device 52 at this time. Consequently, the mechanism 52 is free to expand in the same manner as was the mechanism 50 during actuation of the brake. If the mechanism 50 does not return to its initial position but is enlarged to compensate for brake lining wear, then the mechanism 52 will expand an amount equal to the expansion of the mechanism 50 as shown in dotted lines. Expansion of the mechanism 52 results in adjustment of the shoes 16, 18 and the next time that the cylinder 62 is actuated, the ends 46, 48 of the shoes will pivot about a new point to thus compensate for brake lining wear.

There are several advantages inherent in the use of two adjusting mechanisms 50, 52. Firstly, the adjustment is made, not by forcing the brake shoe outwardly, but by taking up the slack when the shoe is forced outwardly by the cylinder 62. This method obviates the possibility of the adjusting mechanism acting to cause unwanted contact of the brake shoes with the brake drum. Another advantage resides in the fact that should one of the adjusting mechanisms 50, 52 fail, the second adjusting mechanism will maintain the brake in satisfactory operation. Of course, if one of the adjusting mechanisms should fail, the remaining mechanism will not be capable of causing automatic adjustment of the shoes.

Figure 6:
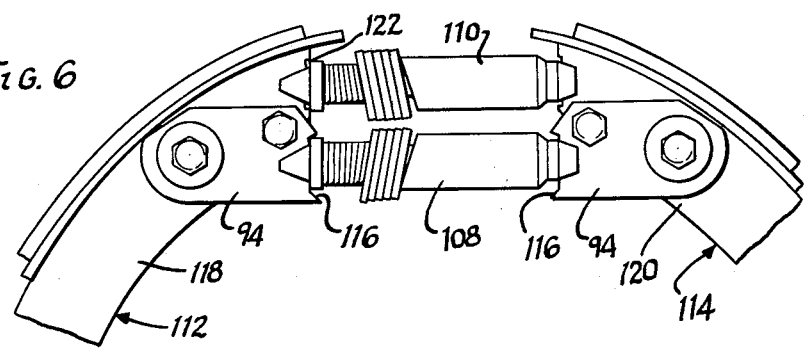
FIGURE 6 is a view of the conversion device of FIGURE 5 shown mounted on a brake.
Figure 5:
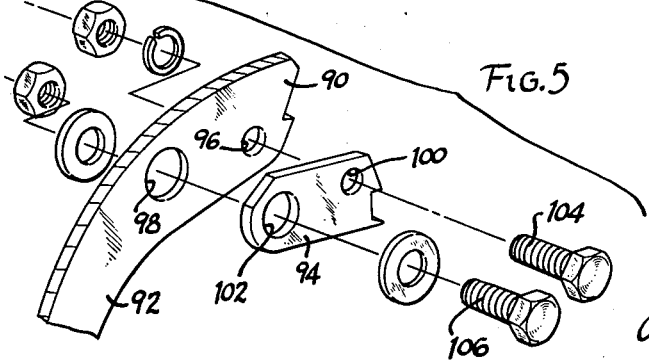
FIGURE 5 is an exploded view of a conversion mechanism for applying the present invention to a conventional brake.

FIGURES 5 and 6 illustrate a structure for converting a conventional brake construction to permit application of the adjusting mechanisms of the present invention. As will be noted in FIGURE 5, the end 90 of the plate 92 of a conventional brake shoe is relatively narrow. It would not be possible to mount two of the adjusting mechanisms on end 90. Therefore, a plate 94 is provided for attachment to the end 90.

The plate 92 is conventionally provided with a pair of openings 96, 98. The opening 98 is a relatively large opening and is utilized for locating purposes in the standard brake. The opening 96 is provided for the mounting of the conventional manual adjusting mechanism. The plate 94 is provided with a pair of openings 100, 102 which register with the openings 96, 98. The opening 102 is relatively large and, in conjunction with the relatively large opening 98, permits adjusting of the plate 94 with respect to the plate 92, to properly orient the plate 94. Nut and bolt structures 104, 106 are provided to secure the plate 94 to the plate 92. The shank of the bolt 106 is of smaller diameter than the diameter of the openings 98, 102 to permit the above-mentioned adjusting.

FIGURE 6 illustrates a portion of a brake with the conversion device of FIGURE 5 mounted and with a pair of adjusting mechanisms 108, 110 extending between the shoes 112, 114. As will be noted, one of the mechanisms 108 extends between the two plates 94. A notch 116 is provided to position the mechanism 108. The second adjusting mechanism 110 extends between the plates 118, 120 of the shoes 112, 114. As will be noted, a notch 122 is provided in the plates and acts to properly position the adjusting mechanism. The operation of the structure shown in FIGURE 6 is the same as that previously described in connection with FIGURE 1.

Having thus described our invention, we claim:

1. In a brake comprising a brake drum with an annular flange, a pair of semi-circular brake shoes within the drum spaced from the annular flange thereof, each of said brake shoes having a brake lining for braking contact with said annular flange, and means for moving first ends of the brake shoes toward and away from said flange, the improvement comprising the provision of automatic adjustnig means for spacing the exterior surface of the brake shoe linings the desired distance from the interior surface of the annular flange, said brake shoes each having a second elongated end surface, said adjusting means comprising a pair of closely adjacent adjusting structures each extending between the second end surfaces of the brake shoes, a first one of said adjusting structures being positioned radially inwardly of the brake drum with respect to the second of the adjusting structures whereby when the first ends of the brake shoes are moved toward the drum flange, the second ends of the shoes will pivot about said second adjusting structure and when said first ends of the shoes are moved away from the drum flange, the second ends of the shoes will pivot about said first adjusting structure, each of said adjusting structures being axially expandable, means constantly urging the adjusting structures to expand axially, axial expansion of the adjusting structures occurring as the brake shoe lining wears, said first adjusting structure expanding when the shoes are pivoted about said second adjusting structure and said second adjusting structure expanding when the shoes are pivoted about said first adjusting structure.

2. In a brake comprising a brake drum with an annular flange, a pair of semi-circular brake shoes within the drum spaced from the annular flange thereof, each of said brake shoes having a brake lining for braking contact with said annular flange, and means for moving first ends of the brake shoes towards and away from said flange, the improvement comprising the provision of automatic adjusting means for spacing the exterior surface of the brake shoe linings the desired distance from the interior surface of the annular flange, said brake shoes each having a second elongated end surface, said adjusting means comprising a pair of closely adjacent adjusting structures each extending between the second end surfaces of the brake shoes, a first one of said adjusting structures being positioned radially inwardly of the brake drum with respect to the second of the adjusting structures whereby when the first ends of the brake shoes are moved towards the drum flange, the second ends of the shoes will pivot about said second adjusting structure and when said first ends of the shoes are moved away from the drum flange, the second ends of the shoes will pivot about said first adjusting structure, each of said adjusting structures being axially expandable, locking means to releasably hold the adjusting structures in an expanded position, means constantly urging the adjusting structures to expand axially, axial expansion of the adjusting structures occurring as the brake shoe lining wears, said first adjusting structure expanding when the shoes are pivoted about said second adjusting structure, and said second adjusting structure expanding when the shoes are pivoted about said first adjusting structure, the locking means for the adjusting structures permitting slight retraction of the adjusting structures upon pivoting of the shoes about said structures to provide for the normal spacing between the exterior surface of the brake shoe lining and the interior surface of the annular flange.

3. In a brake comprising a brake drum with an annular flange, a pair of semi-circular brake shoes within the drum spaced from the annular flange thereof, each of said brake shoes having a brake lining for braking contact with said annular flange, and means for moving first ends of the brake shoes towards and away from said flange, the improvement comprising the provision of automatic adjusting means for spacing the exterior surface of the brake shoe linings the desired distance from the interior surface of the annular flange, said brake shoes each having a second elongated end surface, said adjusting means comprising a pair of closely adjacent adjusting structures each extending between the second end surfaces of the brake shoes, a first one of said adjusting structures being positioned radially inwardly of the brake drum with respect to the second of the adjusting structures whereby when the first ends of the brake shoes are moved toward the drum flange, the second ends of the shoes will pivot about said second adjusting structure and when said first ends of the shoes are moved away from the drum flange, the second ends of the shoes will pivot about said first adjusting structure, each of said adjusting structures comprising a sleeve pivotally connected at one end to the second end of one of the brake shoes, a pin telescopically received in the other end of said sleeve, said pin being pivotally connected to the second end of the other of said brake shoes, said other end of the sleeve having an axial projection, a plurality of washers mounted on the pin and abutting against said axial projection, spring means on said pin exerting a force against said pin and against said washers urging axial separation of the sleeve and pin, abutment of said washers against the projecting portion of the sleeve acting to cock the washers on the pin and lock the pin against retraction into the sleeve, axial separation of the sleeve and pin of the adjusting structures occurring as the brake shoe lining wears, said first adjusting structure expanding when the shoes are pivoted about said second adjusting structure and said second adjusting structure expanding when the shoes are pivoted about said first adjusting structure.

4. Automatic adjusting means as claimed in claim 3 and further characterized in that said washers permit slight retraction of the pin into the sleeve before lockingly engaging the pin to thereby space the exterior surface of the brake shoe lining a slight distance from the interior surface of the drum flange.

5. A device as claimed in claim 3 and further characterized in the provision of means for mounting the adjusting structures on a conventional brake shoe, the conventional shoe having a substantially semi-circular plate for mounting of the brake shoe lining, said plate having an interior flange for connection with the adjusting structure, said interior flange having openings adjacent one end thereof, said one end of said flange being capable of receiving only one of the adjusting structures, a mounting plate secured to said one end for receiving the second of said adjusting structures, said mounting plate having a notch therein for pivotal connection of one end of an adjusting structure, openings within said mounting plate to register with said openings in the flange, and nut and bolt structures received through said registering openings to secure the mounting plate to the flange.

6. Automatic adjusting means for a brake, said brake including a brake drum and a pair of semi-circular brake shoes within the drum, said brake shoes being pivotally mounted at one end thereof on said adjusting means for pivoting into braking engagement with the brake drum, said one end of each shoe comprising an elongated end surface, said adjusting means comprising first and second closely adjacent members each extending between said elongated end surfaces of the shoes and pivotally engaged with the shoes to provide for pivoting of the shoes thereabout, the first adjusting member being positioned closer to the drum periphery than the second adjusting member so that the shoes will pivot about the first member when moved into braking engagement with the drum, each of said adjusting members including a pair of telescopic elements, means urging telescopic expansion of said elements to move said ends of the shoes closer to the drum periphery, locking means to hold the elements in an expanded position, said locking means being effective to permit slight retraction of the elements after each expansion thereof to provide for normal brake shoe-brake drum spacing, said second adjusting member, after telescopic expansion thereof, acting as the pivot member during retraction of the shoes to thereby permit said first adjusting member to telescopically expand an amount equal to the expansion of the second adjusting member.

7. Adjusting means as claimed in claim 6 and further characterized in that each of the adjusting members comprises a sleeve pivotally engaged at one end with the end of one brake shoe, a pin telescopically received in the other end of the sleeve, said pin pivotally engaging the end of the other brake shoe, the surface of said other end of the sleeve forming an angle other than ninety degrees to the longitudinal axis of the sleeve, a plurality of washers on the pin in abutment with said other end of the sleeve, a coil spring on the pin urging separation of the pin and sleeve, said spring acting against the washers forcing the washers against said other end of the sleeve whereupon the washers are canted with respect to the longitudinal axis of the pin to grip the pin and prevent movement of the pin into the sleeve, said washers, however, permitting slight movement of the pin into the sleeve during the canting thereof.

References Cited in the file of this patent
UNITED STATES PATENTS

| 2,168,646 | Goepfrich | Aug. 8, 1939 |
| 2,191,429 | Jenkins et al. | Feb. 20, 1940 |
| 2,981,379 | Burrell | Apr. 25, 1961 |